July 25, 1933.   A. P. ROBINSON   1,919,749
PIVOTALLY SUPPORTED WIND WING
Filed April 21, 1930   6 Sheets-Sheet 1
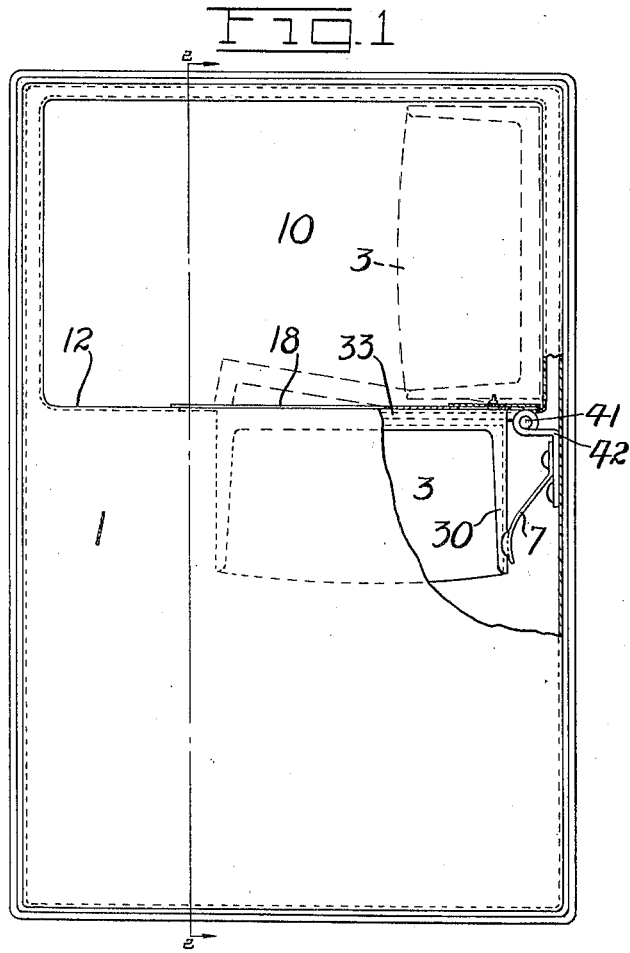
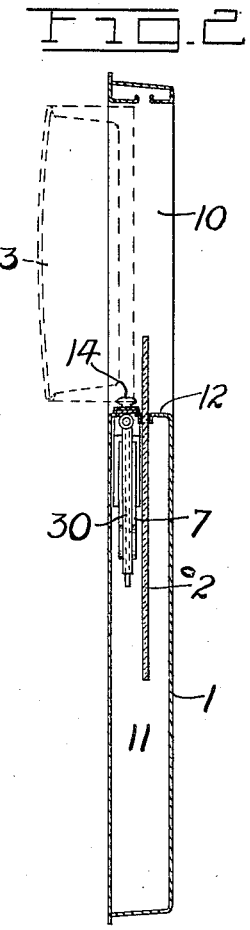
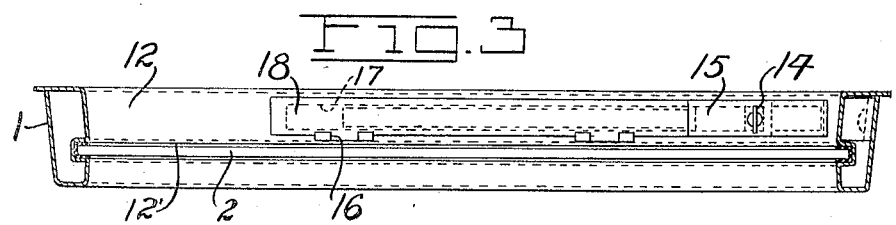
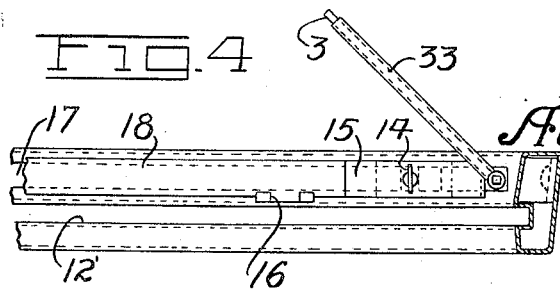
Inventor
Albert P. Robinson
By Charles L. Reynolds
Attorney July 25, 1933.   A. P. ROBINSON   1,919,749
PIVOTALLY SUPPORTED WIND WING
Filed April 21, 1930   6 Sheets-Sheet 2

Inventor
*Albert P. Robinson*
By *Charles L. Reynolds*
Attorney

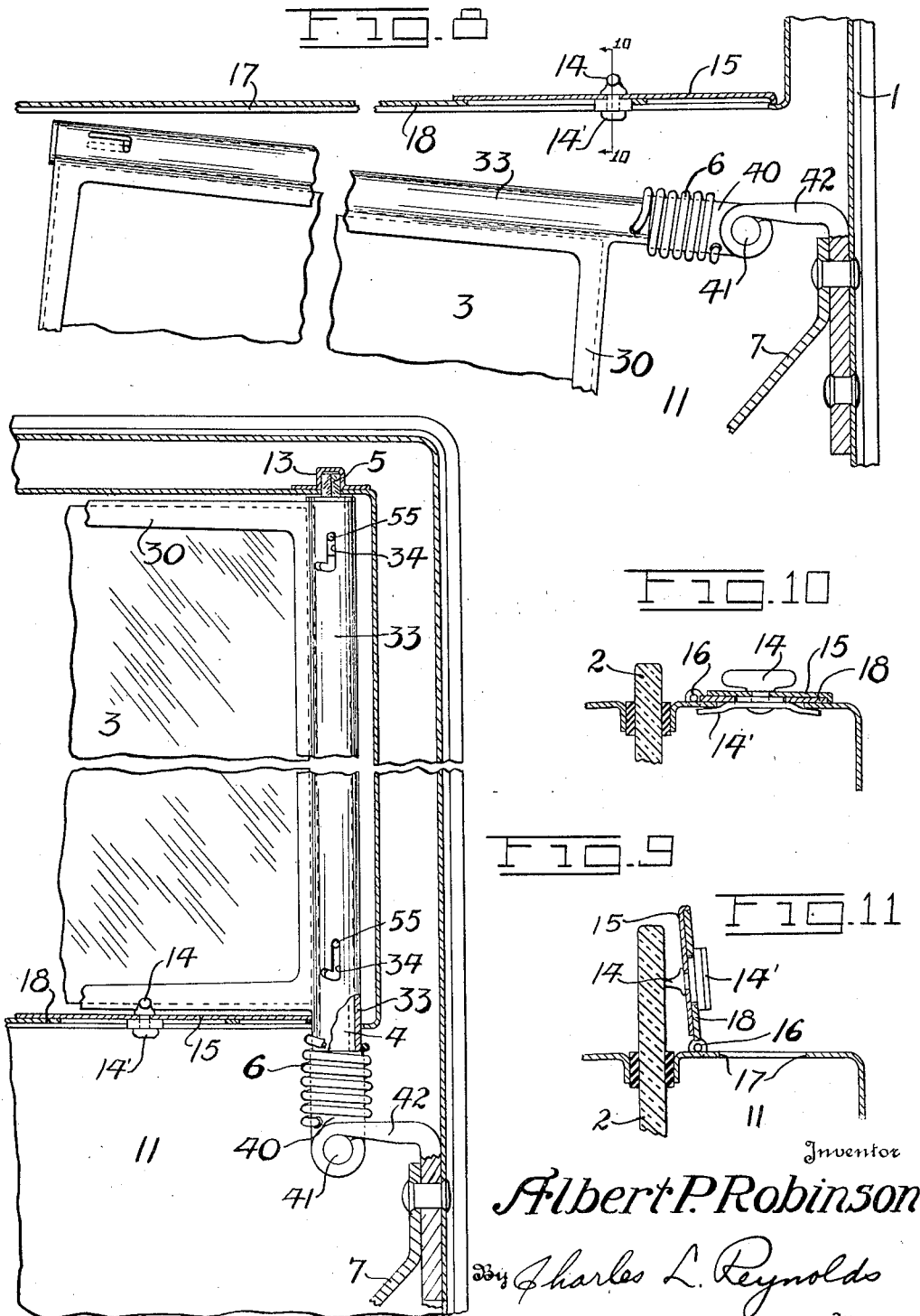

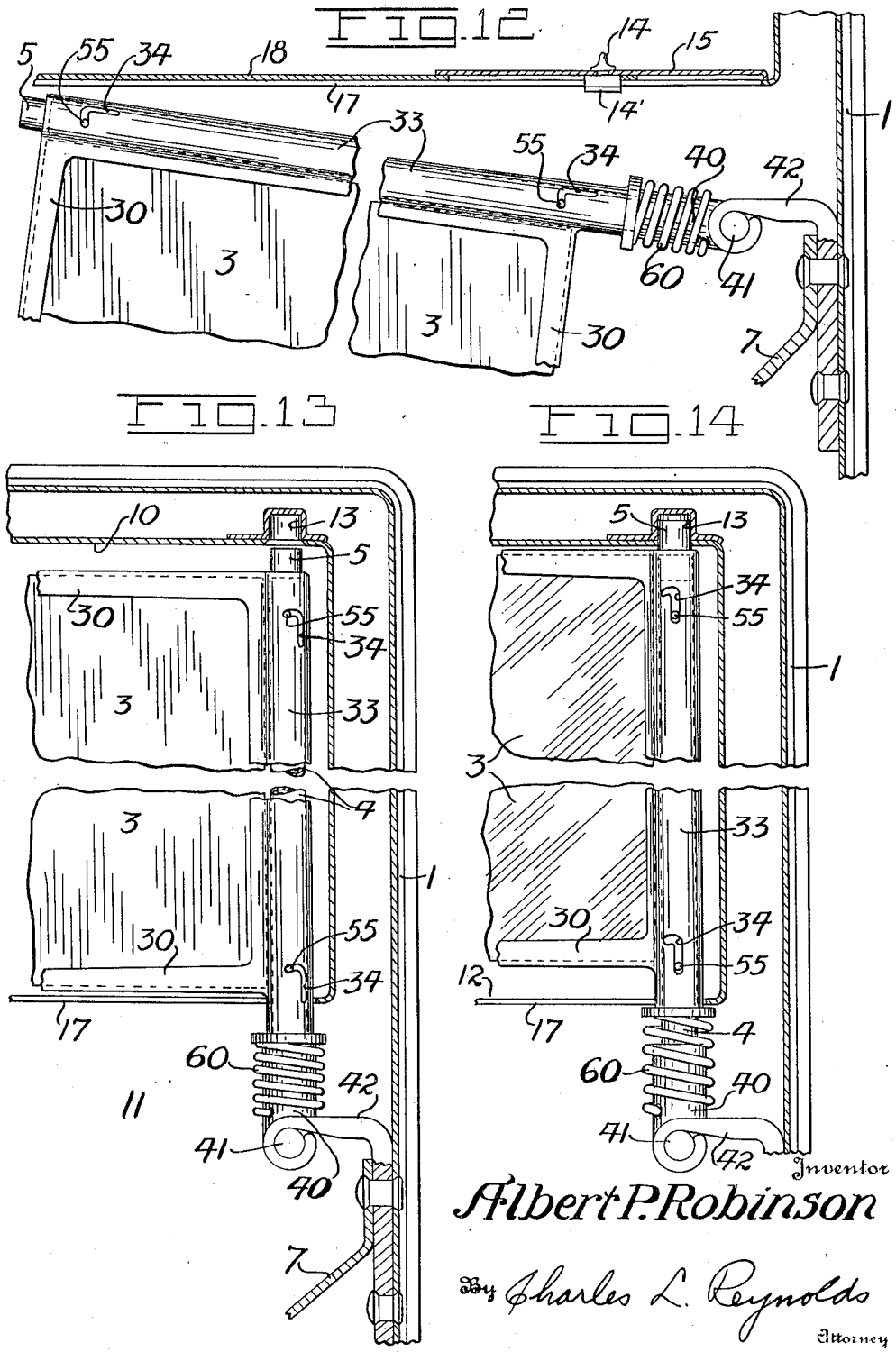

July 25, 1933.     A. P. ROBINSON     1,919,749
PIVOTALLY SUPPORTED WIND WING
Filed April 21, 1930     6 Sheets—Sheet 5
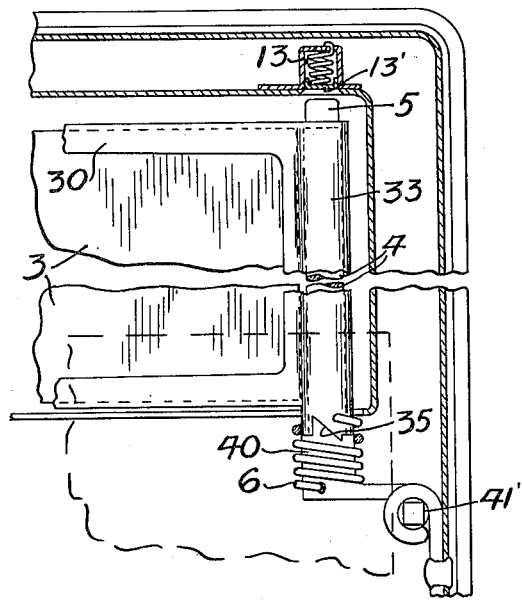
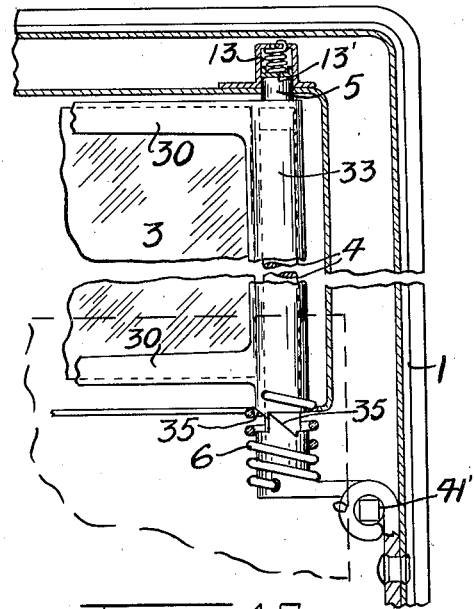
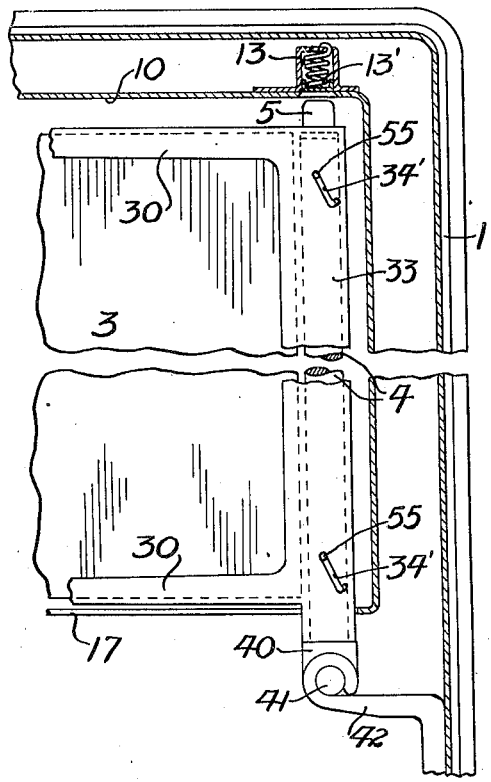
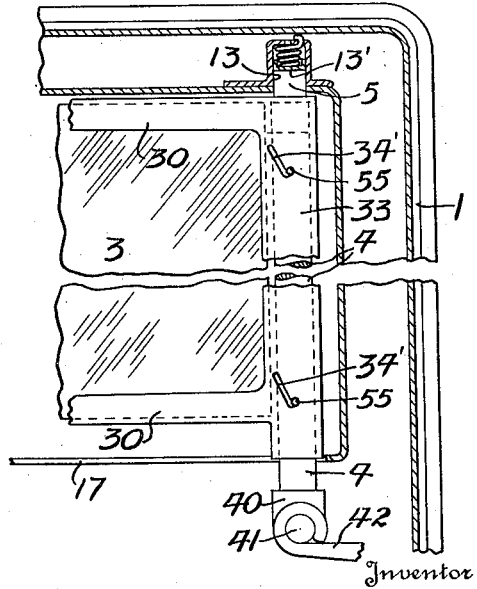
Inventor
*Albert P. Robinson*
By *Charles L. Reynolds*
Attorney

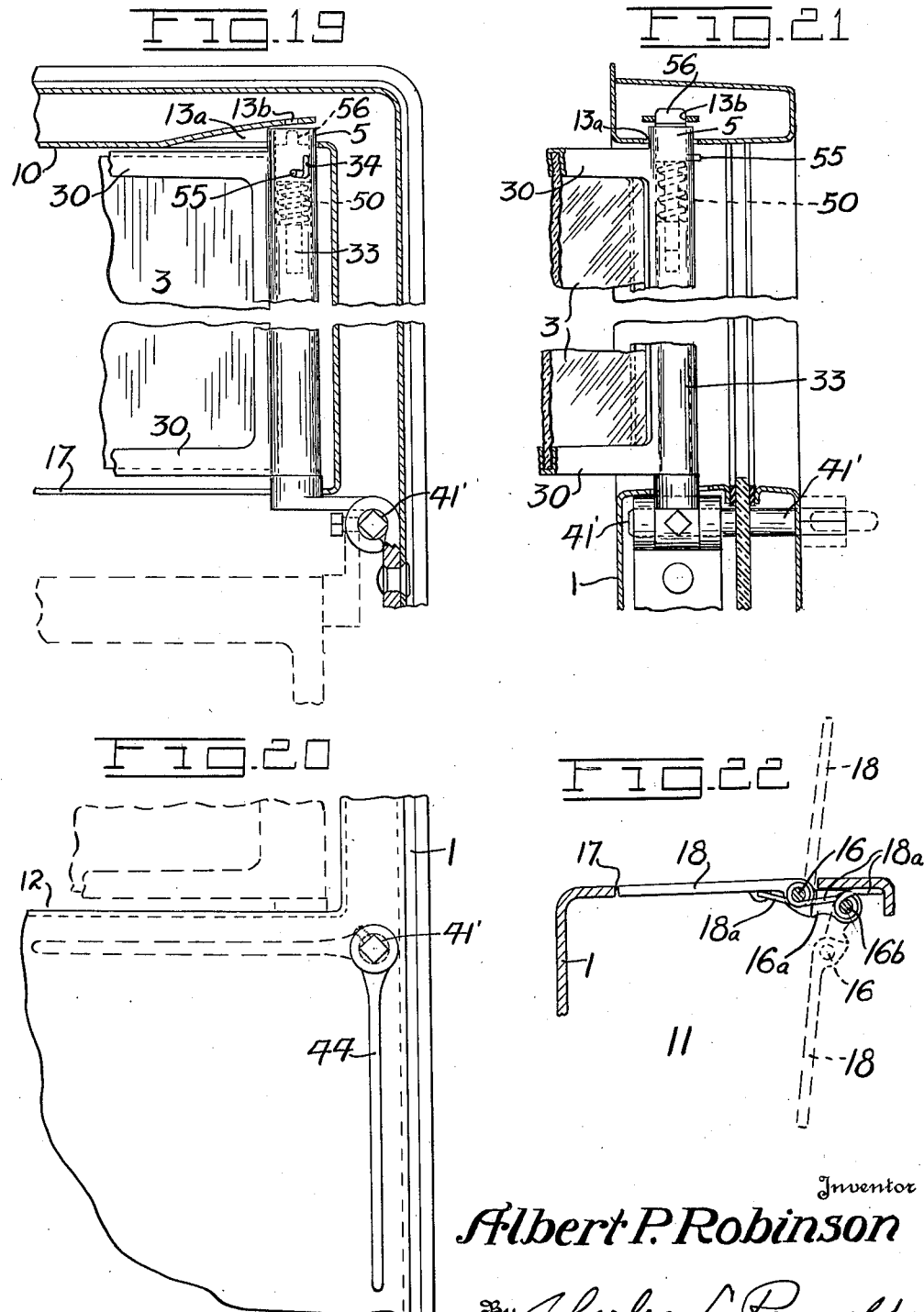

Patented July 25, 1933

1,919,749

UNITED STATES PATENT OFFICE

ALBERT P. ROBINSON, OF SEATTLE, WASHINGTON

PIVOTALLY SUPPORTED WIND WING

Application filed April 21, 1930. Serial No. 445,929.

My invention relates to wind wings or deflectors of the type that are applied to automobiles, and in particular comprises an improvement upon the deflector and support therefor as shown in my application Serial No. 396,996, filed October 3, 1929.

In that application was disclosed the thought of so storing a wind deflector within the lower part of an automobile door that it is out of the way when not desired, but can be quickly and easily brought up into operative position and held there, and which can, when its use is not desired, be replaced in the storage space. The present invention relates particularly to a means for mounting and swinging the deflector into and out of a storage chamber, from inoperative to operative position, through an intermediate upraised position, and for securing it in its operative position.

In particular, the object of this invention is to provide a simplified and convenient means of securing the deflector in or removing it from operative position, so simple, in fact, that all operations can be carried out quickly and easily with one hand, largely automatically, leaving the other hand for the control of the car.

A further object is to provide a convenient, rigid, and secure means for securing the deflector in the door structure.

It is a further object to provide a means for closing over the slot or space into which the deflector is dropped when stored away, and to provide means whereby this opening can be completely closed when the deflector is up in operative position, so that there can not be dropped into this slot papers, trash, cigarette butts, and the like.

My invention comprises the novel parts and the novel combination and arrangement thereof, as shown in the accompanying drawings, described in the specification and as will be particularly defined by the claims terminating the same.

In the accompanying drawings I have shown my invention in forms which are now preferred by me.

Figure 1 is a general inside view of an automobile door, parts being broken away, and illustrating a simple manner of mounting and storing my deflector.

Figure 2 is a vertical section through such a door, taken substantially on the line 2—2 of Figure 1.

Figure 3 is a horizontal section through such a door, taken through the window aperture.

Figure 4 is a detail view similar to Figure 3, showing parts in operative position.

Figure 5 is an inside view of such a door and deflector, parts of the door and deflector being broken away and shown in section, showing parts in position just prior to being placed in full operative position, while

Figure 8 is a side elevation of the form of my deflector which in many ways is the preferred form, in stored position, the door structure being shown in section.

Figure 9 is a view similar to Figure 8, showing parts in the operative position.

Figures 10 and 11 are each a section substantially on the line 10—10 of Figure 8, illustrating a detail, in two different positions.

Figure 12 is a view similar to Figure 8 of a modified form, and Figures 13 and 14 are side elevations, the door and part of the deflector support being shown in section, illustrating the same form in an intermediate position and in fully operative position, respectively.

Figures 15 and 16 are views of a further modified form, showing parts respectively in an intermediate position and in fully operative position.

Figures 17 and 18 are views corresponding to Figures 15 and 16, showing a further modification.

Figure 19 is a view of a further modification, showing parts in an intermediate position.

Figure 20 is an inside elevation of the operating means for the form shown in Figure 19.

Figure 21 is a transverse sectional view through the door, and illustrating the form of Figures 19 and 20 in fully operative position.

Figure 22 is a sectional elevation of a modified form of trap-door or cover.

Figure 5:
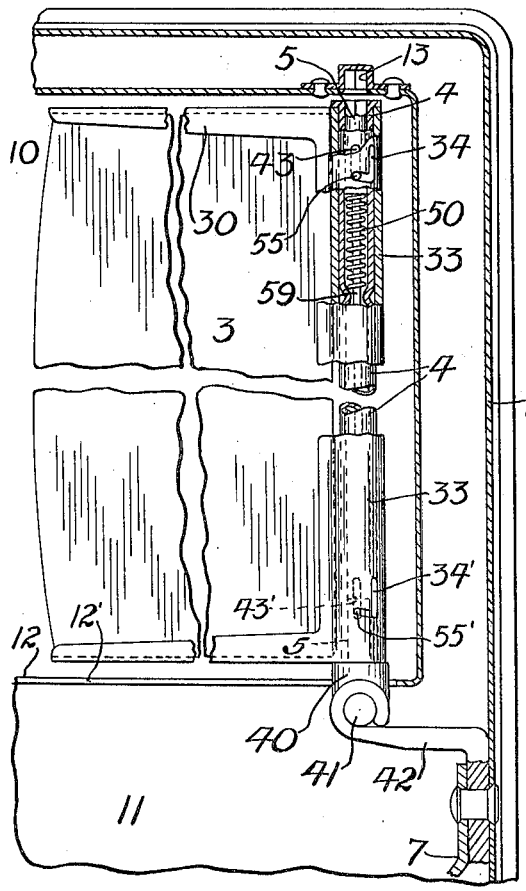

The door 1 of an automobile has been selected for purposes of illustrating the use of the wind deflector 3, though it would be evident that the deflector might be supported in front of one of the windows which was not incorporated in a door, as for instance, in the case of the rear side window of a sedan. That, however, is purely a matter of choice and design. The door, or automobile structure, has the window aperture 10, the sill 12 of which is slotted as indicated at 12' to receive the usual window glass 2. This window glass is dropped into its storage chamber 11 within the door by means which are not shown, but which may be any that are found suitable.

While a separate slot may be provided, as is indicated at 17, the slot 12' may be enlarged to permit entry of the deflector 3 and the customary supporting frame 30. It would ordinarily be the practice to provide a cover 18, which might be hinged as indicated at 16 to the sill 12, to cover the aperture 17, which receives the deflector, and for purposes which will appear hereafter, it is convenient to provide a section 15, which is at the forward end of the cover 18 and which is slidable longitudinally. A catch or button 14, with the T-shaped head 14' within the storage chamber 11, permits sliding of the section 15 relative to the cover 18 (see Figure 10), and this catch, when rotated, permits opening of the cover, or holds the same closed (see Figures 10 and 11).

The frame 30 of the deflector includes the tubular frame member 33, within which is received a pivot sleeve 4. At its lower end, the pivot sleeve 4 is provided with an enlarged head 40, which has a pivotal support upon a transverse pivot pin 41, supporting the pivot sleeve 4 from a bracket 42, within the storage chamber 11 and secured to the door 1. The pivot pin 41 is located preferably just beneath the level of the sill 12, and adjacent the forward edge of the door aperture 10.

By such an arrangement it is possible to swing the deflector upward bodily, together with its frame 30, the tubular frame member 33 and the pivot sleeve 4, from the horizontal inoperative position shown in Figure 1 in full lines, to the upraised dotted line position shown in Figure 1, or shown for instance, in Figure 5. When it has reached this upraised position, being still in the plane of the slot 17, it may be swung (the tubular frame member 33 pivoting on the pivot sleeve 4 upon a generally upright axis) to move the rear edge of the deflector 3 outwardly from the window aperture 10, into operative position.

Figure 6:
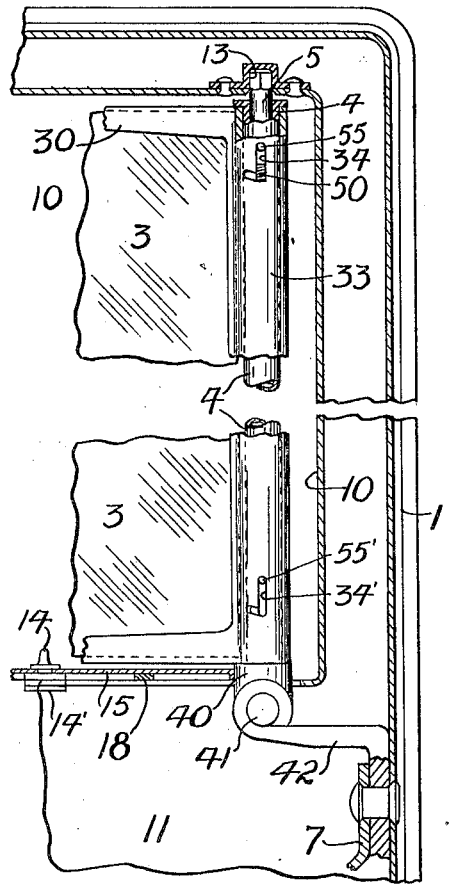
Figure 6 is a similar view, showing parts in their operative position.
Figure 7:
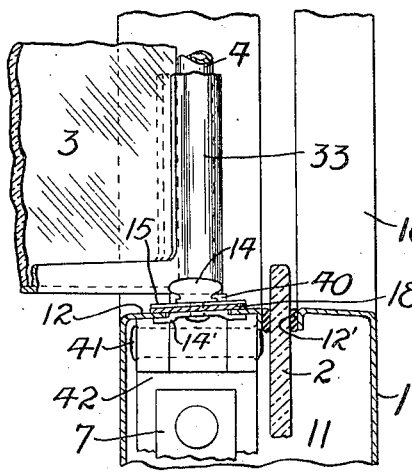
Figure 7 is a transverse vertical section through the parts shown in Figure 6.

It is necessary that some means be provided to hold the deflector in this operative position against the pressure of the air in passing. Such arrangements as were illustrated in my application referred to above may be employed, or I may provide a pivot trunnion 5 in the upper end of the pivot sleeve 4, which is normally held retracted, but urged outwardly by a spring, as 50, and when projected being seated in a socket 13 in the upper, forward edge of the window aperture 10. This trunnion 5 may be circular in cross-section, as seen in Figures 12, 13 and 14, or it may be non-circular, as seen in Figures 5 and 6. It may be arranged to be projected when the deflector is first moved into upright position, and before it has been swung outwardly; or the trunnion may be so controlled or arranged that it automatically projects into the socket 13 when the deflector is swung to its outward operative position. The trunnion may be so arranged further, with respect to its socket, that it will not itself turn in the socket, and the trunnion will be so held with respect to the pivot sleeve 4 and the tubular frame member 33, that there is no relative rotation permitted between the three during the time that the trunnion is projected; see Figures 8 and 9. By these or equivalent means, the deflector may be held in outwardly swung operative position purely by the engagement of the trunnion 5 in its socket 13.

As a means of accomplishing the latter result, I have shown (Figure 5) a pin 55, projecting from the trunnion 5 through a slot 43 in the pivot sleeve 4, which slot extends longitudinally of the sleeve, and through an L-shaped slot 34, which is provided in the tubular frame member 33. So long as the pin 55 is in the horizontal portion of the L-shaped slot 34 the frame member 30 may pivot with respect to the pivot sleeve 4, but the trunnion 5 can not be projected. When the longitudinal portion of the slot 34 comes into registry with the longitudinal slot 43, the pin 55 and the trunnion 5 may slide longitudinally under the influence of spring 50, and engage in the socket 13, whereupon there can not be any further pivotal movement between the frame member 33 and the pivot sleeve 4. The pin 55, it will be understood, projects sufficiently that it can be engaged by the finger of the driver, and drawn down to the bottom of the slots 43 and 34 when it is desired again to store away the deflector 3. When this has been done, the entire deflector can be swung in and down, using one hand only for the entire operation.

It might prove an unduly severe strain upon the trunnion 5 and its socket 13, were they to serve as the sole means to prevent inward swinging of the deflector, and furthermore, the flexing of the glass by reason of the resistance at this one edge might tend to break the glass, and in order to strengthen the bracing of the deflector and further to secure it on its outwardly swung operative position, I may provide slot 43″ at the lower end of the pivot sleeve 4 and a second L-shaped slot 34′ at the lower end of the tubular frame member 33, a pin 55′ projecting outwardly from a plunger 5′ which serves the same function as the corresponding parts at the upper end of the deflector. The plunger 5′ and the trunnion 5 may be connected together by the rod 59 extending through the pivot sleeve 4, thus the single spring 50 will tend to project each plunger in the same direction, and one pin will serve to operate both of them.

In the arrangement thus far described, the swinging of the deflector outwardly into operative position from its first upright position is accomplished manually, though the engagement of the trunnion 5 within its socket 13 may be automatic. In Figures 8 and 9, however, I have shown a spring 6, which may be of stiff material, one end engaging the head 40 of the pivot sleeve 4, and the other engaging a lower portion of the tubular frame member 33, whereby, as soon as the frame 30 and the deflector 3 have been raised from the slot 17 into their upright position, the spring 6 will throw the deflector outwardly and the trunnion 5 will be projected automatically into its socket 13. This renders the operation as nearly as possible automatic, which is my chief aim, yet the storing away of the deflector is accomplished simply by drawing down the pin 55, and swinging the deflector with one hand.

When the deflector is in operative position, the forward end of the slot 17 is occupied either by the head 40 or by the downward extension of the tubular frame member 33, and it is to accommodate this member, yet to close all of the unoccupied space of the slot 17, that the slidable cover section 15 has been provided. This section 15 may be slid rearwardly to afford room for the post or frame member 33 in the end of the slot 17, and to permit movement of the deflector into upright position. It may then be moved forwardly to close all of the unoccupied space. Thus the occupant of the car can not absentmindedly drop bits of trash, paper, and cigarette butts into the storage space 11.

I may provide a spring 7, which is in the nature of a starting spring, and which is held in the storage space 11 in position to be engaged by the frame 30 as the deflector is moved into is final storage position. When the cover 18 is released or removed, the action of the spring 7 throws the deflector upward through the slot 17 into some such position as is indicated in the lower dotted line position of Figure 1, where it can readily be grasped and drawn upward into the upright position.

In Figures 12, 13 and 14, the trunnion 5 has been shown as circular, and as fixed upon the upper end of the tubular frame member 33, and without movement relative to this tubular member 33. However, the tubular member 33 and the frame 30 are movable lengthwise with respect to the pivot member 4, which in this case might be a sleeve, but which would ordinarily take the form of a post which is secured upon and projects from the head 40, pivoted at 41. The pin 55 is in this form secured in the pivot member 4, and the L-shaped slot or slots 34 are formed in the tubular frame 33 as before. As the deflector 3 is swung up from its slot 17 into the position shown in Figure 13, the pins 55 remain in the horizontal portion of the slots 34, but as soon as the deflector is swung outwardly into the operative position, the pins 55 come into alignment with the vertical portion of the slots 34, and under the influence of the spring 60, which tends to move the deflector upwardly, the same moves to engage the projecting trunnion 5 within the socket 13. Inasmuch as the deflector can not be swung inwardly so long as the pins 55 remain in the vertical portions of the respective slots 34, it is held fixed in this position. To return it to its inoperative position, it is only necessary to grasp the deflector and press it downwardly enough to bring the pins 55 into alignment with the horizontal portion of the slot 34, and then to swing the deflector inwardly; it may then be swung down into its slot 17. The entire operation can easily be carried out by one hand in a short space of time, and to a large extent the action is automatic.

The form shown in Figures 15 and 16 differs from that shown in Figures 12, 13 and 14, chiefly in that vertical movement of the tubular frame member 33 relative to the pivot member 4 is accomplished by reason of the inclination of the slot 34′ into which the pins 55 project, so that as the deflector 3 is swung outwardly, the tubular member 33 is given a motion longitudinally of the pivot member 4 to raise the entire frame 30 and deflector 3, and to bring the permanently projecting trunnion 5 into the socket 13. In this instance the stock 13 is shown as provided with a spring-pressed cover 13′. It will be observed that the lower end of the inclined slots 34′ in this form are provided with a slight lateral recess, so that the pins 55 will seat therein and prevent inward swinging of the deflector, but may be unseated by slightly raising the deflector, whereupon the inclination of the slots will swing it inwardly.

In Figures 17 and 18 a similar construction is shown, save that the lower end of the tubular frame member 33 is provided with an inclined surface 35, and the head 40 is provided with a correspondingly inclined surface; the spring 6 tends to swing the frame 30 outwardly, when it has been raised into upright position, and the interaction of the inclined surfaces at 35 moves the entire frame 30 and the tubular frame member 33 with its permanently projecting trunnions 5 directly upwardly, and the inter-engagement of shoulders, as shown in Figure 18, holds parts in this position. To return them to inoperative position, the deflector is lifted slightly to disengage the catch best seen in Figure 18, and is then swung inwardly in opposition to the spring 6.

Figures 19 and 21 illustrate a form of the device wherein the trunnion 5 projects permanently in prolongation of the tubular frame member 33, and wherein the frame member 33 does not rise as it is swung outwardly. To accommodate the swing of the trunnion 5, then, it is necessary that the recess 13a be somewhat elongated, as may best be seen in Figure 19. To hold parts in this position, and as well, to hold the deflector in its outwardly swung operative position, there is provided a locking key 56, which carries the pin 55 in its L-shaped groove 34, this pin being non-circular, and when released springing upward into engagement with a correspondingly shaped aperture 13b in the end of the recess 13a. To release the deflector to store it away, it is only necessary to draw downward the pin 55 and to swing the deflector inwardly, which catches and holds the pin and the locking member 56 in their lowered position.

It will be noted, in connection with Figures 17, 18, 19, 20 and 21, that the pivot 41', upon which the deflector swings, is not in line with the edge of the window aperture 10, as in the other figures, but rather is forwardly thereof. Accordingly, it is possible to extend the pivot pin 41' through to the inside of the door, and past the forward edge of the ordinary window glass, where it may have a handle 44 secured upon a squared end of it, by means of which the deflector may be swung from and into its slot 17. In other words, the manipulation of the deflector more nearly approaches the manipulation required to raise or lower the ordinary automobile window.

In Figure 22 is shown a form of cover or door for the slot 17, which may be adapted to obviate the necessity of manually raising the same, or of unlatching the same. It is designed to be always in place to cover the slot, except at the time when the deflector is partly projected through the slot. Thus, the ordinary pivot may be at 16 as before, this permitting swinging of the door 18 upwardly, but this pivot 16 may be pivoted not direct to the door 1 itself, but to a link 16a, which in turn is pivoted at its opposite end 16b to the under side of the sill. By providing suitable springs 18a, the pivots may be held in a normal position, corresponding in general to the hinge of a double-swung door, whereby it tends to remain horizontal at all times, but may be swung upon yielding of the spring 18a, either up or down to permit respectively the raising of the deflector or its lowering within the storage chamber 11.

I claim:

1. A wind deflector for attachment to an automobile door or the like having a window opening, comprising a pivot base adapted for securement to the door in adjacent relation to a lower front corner of the window opening, and having a pivot axis which extends generally transversely of the automobile, a deflector wing, and means pivotally supporting said deflector wing upon said pivot base to swing from inoperative position, wherein the deflector wing is below the level of the window sill, upwardly into operative position, wherein its theretofore horizontal upper edge lies adjacent an edge of the window opening, and the deflector wing is inclined angularly outwardly therefrom.

2. In combination with an automobile door having a window aperture, the sill of such aperture being slotted, a wind deflector means wholly within the slot and beneath the sill for supporting said deflector for movement in a vertical plane, and then upon an upright axis into operative position, with its rear edge swung outwardly and its forward edge adjacent the forward edge of the window aperture.

3. In combination with an automobile door or the like having a window in its upper portion and a storage chamber therebeneath, a window glass slidable from the storage chamber into position to close said window opening, a wind deflector, and means supporting and guiding said deflector upon the door for pivotal movement from inoperative position, wherein it is disposed in a plane outside of the plane of the window glass and substantially parallel thereto, into operative position, wherein it is in registry with the window opening and inclined outwardly from its forward edge.

4. The combination of claim 3, the sill having a slot admitting to a storage chamber therebelow, the pivotal support for the deflector being positioned below the sill level, and characterized by the provision of a cover plate for the sill slot removable to permit raising of the deflector, and covering the major portion of the slot when the deflector is in operative position, and a cover section movable longitudinally of the slot to accommodate the space required for projection of the deflector support.

5. In combination with an automobile door or the like having a window opening in its upper portion and a storage chamber therebeneath, a window glass slidable from the storage chamber into position to close said window opening, a wind deflector, and means upon the door supporting and guiding said deflector for movement about pivot axes at right angles to each other, from inoperative position, wherein the deflector is disposed below the level of the window sill and in a plane outside of and substantially parallel to the plane of the window glass, first upwardly in its own plane into upright position, wherein it is in registry with the window opening, and then into operative position, wherein it is inclined outwardly from the forward edge of the window opening.

6. In combination with an automobile door or the like having a window opening in its upper portion and a storage chamber therebeneath, a window glass slidable from the storage chamber into the window opening, a wind deflector, and means supporting and guiding the deflector for pivotal movement about a transverse axis from inoperative position, within the storage chamber and below the sill, upwardly into registry with the window opening, and then about an upright axis, substantially coinciding with the forward edge of the window opening, into operative position, wherein it is inclined outward from the forward edge of the window opening.

7. The combination of claim 6, the window sill being slotted to enable passage of the deflector from the storage chamber, and means for closing the sill slot when the deflector is in operative position.

8. The combination of claim 6, the window sill being slotted to enable passage of the deflector from and into the storage chamber, and means independent of the deflector for closing such slot when the deflector is in operative or in inoperative positions.

9. In combination with a window frame defining a window opening, a window glass supported from the frame for movement to open or close the window opening, a wind deflector, means upon the frame supporting and guiding said deflector for pivotal movement from inoperative position, disposed at a level below the window sill, into operative position, in registry with the window opening and inclined outwardly from its forward edge, and means automatically operable when the deflector reaches operative position, to retain the same in such position.

10. In combination with an automobile door or the like having a window opening in its upper portion and a storage chamber therebeneath, a window glass slidable from the storage chamber into position to close said window opening, a wind deflector, means upon the door supporting and guiding said deflector for movement about pivot axes at right angles to each other, from inoperative position, disposed below the level of the window sill and in a plane outside of and substantially parallel to the plane of the window glass, first upwardly in its own plane into upright position, in registry with the window opening, and then into operative position, inclined outwardly from the forward edge of the window opening, and means automatically operable when the deflector reaches upright position to swing it to operative position.

11. In combination with an automobile door or the like having a window opening in its upper portion and a storage chamber therebeneath, a window glass slidable from the storage chamber into position to close said window opening, a wind deflector, means upon the door supporting and guiding said deflector for movement about pivot axes at right angles to each other, from inoperative position, disposed below the level of the window sill and in a plane outside of and substantially parallel to the plane of the window glass, first upwardly in its own plane into upright position, in registry with the window opening, and then into operative position, inclined outwardly from the forward edge of the window opening, means automatically operable when the deflector reaches upright position to swing it to operative position, and means automatically operable when the deflector reaches operative position, to retain the same in such position.

12. In combination with an automobile door or the like having a window opening in its upper portion and a storage chamber therebeneath, a window glass slidable from the storage chamber into position to close said window opening, a wind deflector, means upon the door supporting and guiding said deflector for movement about pivot axes at right angles to each other, from inoperative position, disposed below the level of the window sill and in a plane outside of and substantially parallel to the plane of the window glass, first upwardly in its own plane into upright position, in registry with the window opening, and then into operative position, inclined outwardly from the forward edge of the window opening, and means interengageable between the door and that edge of the deflector which is uppermost when in upright position, to steady the upper end of the deflector while in operative position.

13. In combination with an automobile door or the like having a window opening in its upper portion and a storage chamber therebeneath, a window glass slidable from the storage chamber into position to close said window opening, a wind deflector, means upon the door supporting and guiding said deflector for movement about pivot axes at right angles to each other, from inoperative position, disposed below the level of the window sill and in a plane outside of and substantially parallel to the plane of the window glass, first upwardly in its own plane into upright position, in registry with the window opening, and then into operative position, inclined outwardly from the forward edge of the window opening, and pivot means interengageable between the door and that edge of the deflector which is uppermost when in upright position, and lying in the then upright pivot axis, to steady the upper end of the deflector during movement into and while in operative position.

14. In combination with an automobile door or the like having a window opening in its upper portion and a storage chamber therebeneath, a window glass slidable from the storage chamber into position to close said window opening, a wind deflector, means upon the door supporting and guiding said deflector for movement about pivot axes at right angles to each other, from inoperative position, disposed below the level of the window sill and in a plane outside of and substantially parallel to the plane of the window glass, first upwardly in its own plane into upright position, in registry with the window opening, and then into operative position, inclined outwardly from the forward edge of the window opening, and means interengageable between the door and that edge of the deflector which is uppermost when in upright position, to steady the upper end of the deflector while in operative position, said last-named means including means to lock the deflector in operative position.

15. In combination with an automobile door or the like having a window opening in its upper portion and a storage chamber therebeneath, a window glass slidable from the storage chamber into position to close said window opening, a wind deflector, means upon the door supporting and guiding said deflector for movement about pivot axes at right angles to each other, from inoperative position, disposed below the level of the window sill and in a plane outside of and substantially parallel to the plane of the window glass, first upwardly in its own plane into upright position, in registry with the window opening, and then into operative position, inclined outwardly from the forward edge of the window opening, means interengageable between the door and that edge of the deflector which is uppermost when in upright position, to steady the upper end of the deflector while in operative position, and means to lock the deflector in operative position operable upon engagement of said last-named means.

16. In combination with an automobile door or the like having a window opening and a storage chamber therebeneath, a window glass slidable from the storage chamber into position to close said window opening, a wind deflector, means upon the door supporting and guiding said deflector for movement about pivot axes at right angles to each other, from inoperative position, disposed below the level of the window sill, first upwardly in its own plane into upright position, in registry with the window opening, and then into operative position, inclined outwardly from the forward edge of the window opening, the deflector having a support movable with it into upright position, in the upright axis aforesaid, and including means at top and bottom of said support to prevent unintentional inward swinging of the deflector.

17. In combination with an automobile door or the like having a window opening in its upper portion and a storage chamber therebeneath, a window glass slidable from the storage chamber into position to close said window opening, a wind deflector, means supporting and guiding said deflector upon the door for movement about a horizontal pivot axis from inoperative position, disposed below the level of the window sill, into upright position, in registry with the forward portion of the window opening, and in a plane substantially parallel to and outside of the plane of the window glass, and then about an upright axis at its forward edge into operative position, inclined outwardly and rearwardly, and a trunnion at the upper end of the deflector, disposed in the latter pivot axis, the automobile door having a socket aligned with such latter pivot axis to receive said trunnion.

18. In combination with an automobile door or the like having a window opening in its upper portion and a storage chamber therebeneath, a window glass slidable from the storage chamber into position to close said window opening, a wind deflector, means supporting and guiding said deflector upon the door for movement about a horizontal pivot axis from inoperative position, disposed below the level of the window sill, into upright position, in registry with the forward portion of the window opening, and in a plane substantially parallel to and outside of the plane of the window glass, and then about an upright axis at its forward edge into operative position, inclined outwardly and rearwardly, a trunnion at the upper end of the deflector, disposed in the latter pivot axis, the automobile door having a socket aligned with such latter pivot axis to receive said trunnion, and means to move said trunnion axially into said socket.

19. In combination with an automobile door or the like having a window opening in its upper portion and a storage chamber therebeneath, a window glass slidable from the storage chamber into position to close said window opening, a wind deflector, means supporting and guiding said deflector upon the door for movement about a horizontal pivot axis from inoperative position, disposed below the level of the window sill, into upright position, in registry with the forward portion of the window opening, and in a plane substantially parallel to and outside of the plane of the window glass, and then about an upright axis at its forward edge into operative position, inclined outwardly and rearwardly, a trunnion at the upper end of the deflector, disposed in the latter pivot axis, the automobile door having a socket aligned with such latter pivot axis to receive said trunnion, means operable by outward swinging of the deflector to permit movement of said trunnion into its socket, and spring means operable to project the same.

20. In combination with an automobile door or the like having a window opening in its upper portion and a storage chamber therebeneath, a window glass slidable from the storage chamber into position to close said window opening, a wind deflector, means supporting and guiding said deflector upon the door for movement about a horizontal pivot axis from inoperative position, disposed below the level of the window sill, into upright position, in registry with the forward portion of the window opening, and in a plane substantially parallel to and outside of the plane of the window glass, and then about an upright axis at its forward edge into operative position, inclined outwardly and rearwardly, a trunnion at the upper end of the deflector, disposed in the latter pivot axis, and projectible vertically beyond the upper end of the deflector, the window opening having a complemental socket in the upright axis of the deflector, positioned to receive the trunnion, and means permitting projection of the trunnion only when the deflector has been swung outwardly.

21. The combination of claim 20, the trunnion and its socket being correspondingly non-circular.

22. In combination with an automobile door or the like having a window opening in its upper portion and a storage chamber therebeneath, a window glass slidable from the storage chamber into position to close said window opening, a wind deflector, means upon the door supporting and guiding said deflector for movement about a transverse axis from inoperative position, disposed below the level of the sill, into upright position, in registry with the forward portion of the window opening, and then about an upright axis at the forward edge of the window opening into operative position, inclined outwardly and rearwardly, a trunnion upon the upper forward corner of the deflector, disposed in its upright axis, the window opening having a socket positioned to receive said trunnion, cooperating inclines on the deflector and its supporting means to raise the deflector as it swings from upright to operative position, thereby to engage the trunnion in its socket, and means to lock the deflector in operative position, to prevent unintentional inward swinging or disengagement of the trunnion from its socket.

23. In combination with an automobile body construction having a window opening, the sill of which is slotted to afford access to a storage chamber therebeneath, a pivot base adapted for securement in adjacent relation to a corner at the front edge of the window opening and having a pivot axis which is horizontal and extends transversely of the car, a deflector wing pivoting upon the said pivot base and containing within itself a pivot which is at right angles to the first mentioned pivot and in the plane of the deflector wing, the pivot base, in addition to being located adjacent a front lower corner of the window opening, being also located adjacent the forward edge of said slot, whereby the wing moves therethrough into and from said storage chamber.

24. In combination with a wind deflector and frame therefor including a tubular member at the forward edge of the deflector, a pivot sleeve received within said tubular frame member, permitting swinging of the deflector thereupon, and a horizontal pivot support for the lower end of said sleeve permitting bodily movement of the deflector, frame, and pivot sleeve about the axis of such pivot support.

25. The combination of claim 24, and a trunnion received in the swinging end of the pivot sleeve, and projectible to form a pivot support for the upper end of the frame.

26. The combination of claim 24, a trunnion received in the swinging end of the pivot sleeve, spring means tending to project said trunnion, the pivot sleeve having a longitudinal slot and the tubular frame member having a corresponding L-shaped slot, and a pin upon said trunnion passing through the slot in the pivot sleeve to be received in the horizontal portion of the slot in the tubular member, and adapted to slide longitudinally, with the trunnion, when brought into registry with the longitudinal portion of the slot in the tubular member to permit projection of the trunnion, said pin holding the trunnion, the tubular frame member, and the pivot sleeve against relative rotation.

27. The combination of claim 24, a trunnion received in the swinging end of the pivot sleeve, spring means tending to project said trunnion, the pivot sleeve having a longitudinal slot and the tubular frame member having a corresponding L-shaped slot, a pin upon said trunnion passing through the slot in the pivot sleeve to be received in the horizontal portion of the slot in the tubular member, and adapted to slide longitudinally, with the trunnion, when brought into registry with the longitudinal portion of the slot in the tubular member, to permit projection of the trunnion, means for holding the trunnion, the tubular frame member, and the pivot sleeve against relative rotation, a plunger received in the lower end of the pivot sleeve, a pin carried by said plunger, means connecting the trunnion and plunger to urge said plunger axially, and corresponding slots in the pivot sleeve and tubular frame member to permit longitudinal movement of the plunger simultaneously with the trunnion, and to prevent relative pivotal movement between the lower ends of the pivot sleeve and tubular frame member.

28. In combination with a wind deflector and a frame therefor including a tubular member at the forward edge of the deflector, a pivot post received within said tubular member, permitting swinging of the deflector thereupon, and a horizontal pivot support supporting the lower extremity only of said post, and permitting bodily swinging of the deflector in its own plane through substantially ninety degrees.

29. The combination of a vehicle door having an opening therein and a compartment, a deflector movably mounted upon the door and arranged to be moved to various adjusted positions for deflecting air away from the opening, means for swingably mounting the deflector upon the door whereby the deflector may be moved from the exterior to the interior of said compartment, and means for firmly securing the deflector in its position upon the exterior of the compartment preparatory to shifting the deflector to said adjusted positions.

30. The combination of a door having an opening therein, a supporting rod swingably mounted upon the door and near one side of said opening, and a deflector swingably mounted upon the rod and arranged to be shifted to various air deflecting positions with respect to said opening, said door being provided with a compartment for receiving the deflector.

ALBERT P. ROBINSON.